United States Patent
Nguyen et al.

(10) Patent No.: US 6,260,759 B1
(45) Date of Patent: *Jul. 17, 2001

(54) METHOD FOR TRACKING A TARGET HAVING SUBSTANTIALLY CONSTRAINED MOVEMENT

(75) Inventors: Quan Bach Nguyen, Indialantic; Herbert Landau, Satellite Beach, both of FL (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,274

(22) Filed: Aug. 11, 1998

(51) Int. Cl.$^7$ ................................................ G06C 27/00
(52) U.S. Cl. ............................ 235/411; 235/412; 342/90
(58) Field of Search .................................. 235/411, 412, 235/413, 417, 404; 342/95, 96, 97, 90, 114, 115

(56) References Cited

U.S. PATENT DOCUMENTS

| | | | |
|---|---|---|---|
| 3,304,409 | * 2/1967 | Snowdon et al. ............... 235/411 |
| 3,971,018 | * 7/1976 | Isbister et al. ................... 343/5 |
| 4,042,924 | 8/1977 | Evans et al. .................. 343/7 A |
| 4,072,943 | 2/1978 | Miller ........................... 343/6.5 |
| 4,148,026 | * 4/1979 | Gendreu ..................... 235/410 X |
| 4,156,875 | * 5/1979 | Keane et al. .................. 343/7.3 |
| 4,173,017 | 10/1979 | Burlage et al. ................ 343/7.7 |
| 4,179,696 | * 12/1979 | Quesinberry et al. .......... 343/7.4 |
| 4,385,298 | 5/1983 | Josefsson et al. ............. 343/7.7 |
| 4,633,261 | 12/1986 | Kosaka et al. ................ 342/430 |
| 4,636,793 | 1/1987 | D'Addio et al. ............... 342/162 |
| 4,760,397 | * 7/1988 | Piccolruaz ...................... 342/75 |
| 4,959,800 | * 9/1990 | Woolley ........................ 235/411 |
| 5,049,889 | 9/1991 | Hol et al. ...................... 342/160 |
| 5,107,271 | 4/1992 | White ........................... 342/195 |
| 5,144,316 | 9/1992 | Uhlmann et al. ............. 342/189 |
| 5,311,189 | 5/1994 | Nagel ............................. 342/95 |
| 5,325,098 | 6/1994 | Blair et al. ..................... 342/95 |
| 5,379,044 | 1/1995 | Carlson et al. ................. 342/90 |
| 5,381,156 | 1/1995 | Bock et al. ................... 342/126 |
| 5,396,252 | 3/1995 | Kelly ............................. 342/94 |
| 5,465,095 | 11/1995 | Bryant .......................... 342/159 |
| 5,479,360 | 12/1995 | Seif et al. ..................... 364/516 |
| 5,539,408 | 7/1996 | Moreira et al. ................. 342/25 |
| 5,564,650 | * 10/1996 | Tucker et al. ................. 244/3.17 |
| 5,657,251 | 8/1997 | Fiala ............................. 342/162 |
| 5,835,059 | * 11/1998 | Nadel et al. .................. 342/398 |
| 6,018,307 | * 1/2000 | Wakayama et al. ............ 342/26 |

FOREIGN PATENT DOCUMENTS 196 26 645 * 4/1997 (DE) .
2 258 361 * 6/1986 (GB) .

* cited by examiner

Primary Examiner—Michael G. Lee
Assistant Examiner—Diane I. Lee
(74) Attorney, Agent, or Firm—Terry J. Anderson; Karl J. Hoch, Jr.

(57) ABSTRACT

A method for tracking a target having substantially constrained movement utilizes the steps of determining constrains for movement of the target, obtaining information on movement of the target, and predicting that the target will continue to move upon a route segment after the target has begun to move thereupon. The constraints are made up of a plurality of separate alternate route segments. Predicting that the target will continue to move upon the route segment upon which it is previously moving facilitates targeting, intercept and intelligence with a substantial degree of reliability, particularly when continuing information, such as radar returns, is not available.

23 Claims, 6 Drawing Sheets

EXAMPLE OF STATIC NETWORK STRUCTURE

EXAMPLE OF CONSTRAINED TRACK NETWORK TRAVERSAL

MTI TRACKING PARAMETERS

CLUSTERING

◆ PROCESS ALL AOI   ◇ PROCESS SCALED WINDOW

TRACKING

☐ ON/OFF

☐ ON/OFF
☐ DISPLAY ON/OFF

| | |
|---|---|
| [1] | MIN TARGETS PER CLUSTER (1→NO MIN CLUSTER SIZE) |
| [X.X] | DOPPLER GATE (M/S) |
| [2000.0] | COARSE DISTANCE GATE (M) |
| [300.0] | FINE DISTANCE GATE (M) |
| [X.X] | DOWN RANGE SIGMA (M) |
| [X.X] | RANGE RATE SIGMA (M/S) |

◆ DISPLAY LATEST LOCATION          ◇ DISPLAY COMPLETE HISTORY
◆ DISPLAY UPDATED STATES           ◇ DISPLAY EXTRAPOLATED STATES
☐ USE AREA VISIBILITY INFO         ■ USE HRR INFO
■ USE RANGE RATE QUALITY INFO      ☐ USE WHEELED/TRACKED INFO

| | |
|---|---|
| [10.0] | HRR-DERIVED LENGTH THRESHHOLD (M) |
| [3] | # INITIAL CORRELATION CHANCES |
| [3] | # MISCORR BEFORE DELETION |
| [90.0] | MAX REVISIT INTERVAL (SEC) |
| [2.5] | MANEUVER DETECT SIGMA |
| [3.0] | ASSOCIATION SIGMA |

| | |
|---|---|
| [2] | # INITIAL CORRELATIONS REQUIRED |
| [10] | MAX # BLIND COUNT |
| [0.5] | QUIESCENT DETECT SIGMA |

[DONE]                    [CANCEL]

*Fig. 6*

METHOD FOR TRACKING A TARGET HAVING SUBSTANTIALLY CONSTRAINED MOVEMENT

FIELD OF THE INVENTION

The present invention relates generally to target tracking and relates more particularly to a method for tracking one or more targets which have substantially constrained movement. The method of the present invention is particularly applicable to the tracking of ground targets upon roadways and the like via radar.

BACKGROUND OF THE INVENTION

As those skilled in the art will appreciate, the automatic creation and maintenance of coherent tracks from all radar detections substantially enhances the utility of such radar data. Moreover, the creation and maintenance of such tracks is essential to situational awareness and the data fusion process.

In some instances, there may be thousands of moving targets which must be monitored at any given time. Thus, radar information must be filtered before meaningful information can be provided thereby. Proper filtering of the radar data is necessary in order to provide a correct interpretation of the order of battle.

According to contemporary methodology, such radar filtering is performed by a tracking function. The tracking function generates and maintains a track for each desired target. Ideally, the tracking function prevents nearby targets, such as those on intersecting courses, from being confused with one another. The tracking function also mitigates clutter. Clutter is the presence of undesirable radar signals, which are typically due to radar returns from unimportant objects such as weather, birds, turbulent bodies of water, etc.

Such filtering of radar information by the tracking function substantially enhances situational awareness, particularly by freeing an operator from having to perform a visual association of radar returns. Such visual association or radar returns may, indeed, be an impossible task, particularly in very dense, dynamic target scenarios.

Contemporary tracking systems are only capable of manually creating a few tracks, which are then maintained by a computer. The computer must deduce traffic patterns from remaining radar returns, thus introducing an undesirable time delay. Those skilled in the art will appreciate that it is desirable to automatically generate tracked targets and to present radar operators therewith, so as to substantially enhance situation awareness by presenting useable data at a much faster rate. In this manner, automatic target tracking provides an overall picture of the monitored area, e.g., battle field, which assists in identifying the order of battle, as well as eventually preforming battle management.

SUMMARY OF THE INVENTION

The present invention specifically addresses and alleviates the above-mentioned efficiencies associated with the prior art. More particularly, the present invention comprises an automatic, moving target tracker which provides kinematic tracking of targets which have substantially constrained movement, particularly ground-based targets. Such targets are tracked over time via the processing of their derived position and velocity data, particularly via radar return information. However, those skilled in the art will appreciate that various other means for obtaining position and velocity data are likewise suitable. For example, position and velocity data may be obtained via video surveillance, intelligence reports, laser scanners, etc. Thus, discussion of radar in this patent application is by way of example only, and not by way of limitation.

Further, track association may be performed via other types of information, such as estimated length, domain knowledge, or feedback from the fusion function, when such information is available.

When radar return information is utilized, it may come from either ground-based vehicles or low-flying, relatively slow helicopters or aircraft.

More particularly, the present invention comprises a method from tracking a target having substantially constrained movement, such as a ground-based target traveling upon a roadway or a ground-based target whose movement is substantially constrained by terrain, e.g., hills, mountains, forests, lakes, rivers, etc. (physical constraints in the environment of the target).

Such ground-based targets typically include tanks, armored vehicles, troop transport vehicles, trucks, jeeps, and any other military or civilian vehicles, knowledge of the location of which is desirable, particularly in war-time.

The method of the present invention generally comprises the steps of determining constraints for movement of the target, the constraints comprising a plurality of alternate route segments, obtaining information on movement of the target, and predicting that the target will continue to move upon a route segment after the target has begun to move thereupon. As mentioned-above, these constraints generally comprise the location of roadways and terrain features for land-based targets.

Predicting that the target will continue to move upon the route segment facilitates targeting, intercept and intelligence with a substantial degree of reliability.

The method for tracking a target of the present invention further comprises the step of predicting which one of a plurality of alternate track segments a target will select based upon an assumption of the destination of the target. Thus, when a reasonable assumption of the ultimate destination of the target can be provided, then prediction of target movement can be made even when a target has alternate routes upon which it may move.

The target tracking methodology of the present invention particularly useful when consistent, periodic radar returns or the like are not available. In this situation, the targets remain unmonitored for various periods of time. As those skilled in art will appreciate, it is desirable to provide estimates of the likely position of such targets when reliable radar information relating thereto is not available. Such estimates may be utilized to facilitate targeting, intercept, and intelligence gathering.

Preferably, the present invention comprises predicting one of a plurality of alternative track segments, also called route segments, which a target is likely to accept based upon an assumption of the destination of the target, as discussed above. Prediction of the location of the target is based upon a previous speed of the target and/or at least one speed affecting condition of the route segment upon which a target is moving. Thus, the average speed, for instance, of the target may be utilized by assuming that the target maintains its average speed. Alternatively, an instantaneous speed may be utilized, if necessary. The assumed speed of the target may be modified by taking into consideration conditions of the route segment upon which a target is moving. For example, if the target was previously moving at a high rate speed upon a paved roadway and then enters a dirt or gravel road, then an appropriate reduction in speed may be assumed.

Preferably, radar information regarding the location and velocity of the target is obtained periodically. However, as those skilled in the art will appreciate, such radar information may be available only on an intermittent, and unpredictable basis.

However, according to the present invention, a plurality of targets having substantially constrained movement may be tracked by determining constraints for movement of the targets, the constraints comprising a plurality of alternate route segments for each target and obtaining information on movement of the targets. Then, predictions that each of the targets will continue upon a route segment after the target has begun movement thereupon is made. Predictions are made that each of the targets will continue to move upon a route segment after that target has begun to move thereupon. In this manner, the plurality of moving targets may be monitored with a substantial degree of reliability. Optionally, a group of targets may be defined and tracked as though the group were actually a single target. In this manner, large numbers of targets may be tracked without correspondingly burdening the computer performing the tracking algorithm.

These, as well as other advantageous of the present invention will be more apparent from the following description and drawings. It is understood that changes in the specific structure shown and describe may be made within the scope of the claims without departing from the spirit of the invention.

BRIEF DESCRIPTION OF THE DRAWINGS

FIG. 6 shows user selected tracking perimeters according to the present invention;

DETAILED DESCRIPTION OF THE PREFERRED EMBODIMENTS

Figure 1:
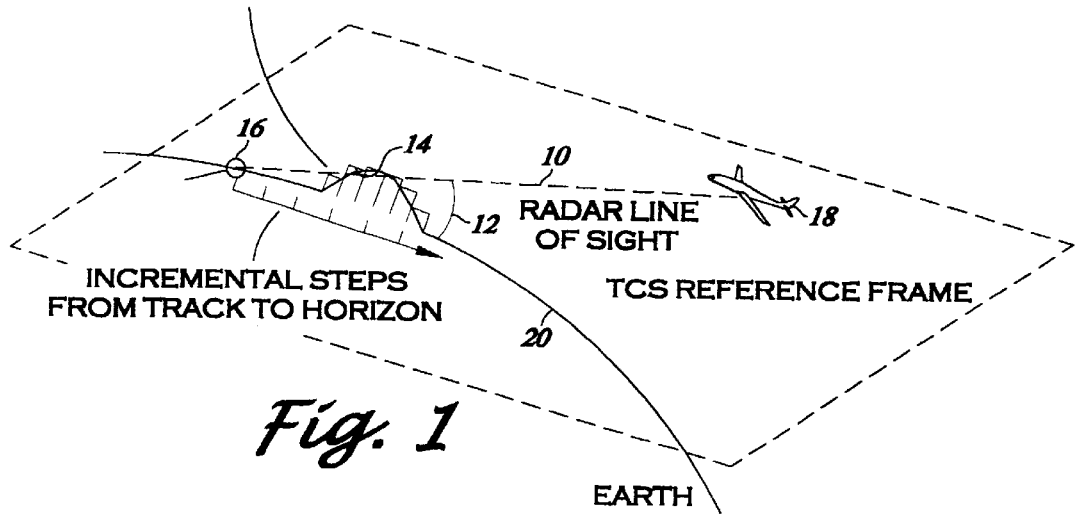
FIG. 1 is a schematic representation illustrating track screening determination according to the present invention.

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The method for tracking a target having substantially constrained movement of the present invention is illustrated in FIGS. 1 through 8 which depict a presently preferred embodiment thereof.

Within the contexts of $C^2I$ (Control Command Intelligence),tracking function of the present invention provides kinematic tracking of a large number of ground-based moving target indicators (MTIs). The tracking function of the present invention facilitates the association of two or more MTIs over time via the processing of the derived position and velocity data, typically via the use of radar returns. However, the design of the tracking function of the present invention does not preclude the incorporation of track association via domain knowledge, or feedback from a fusion function, when these types of information become available. The exemplary description provided herein is limited to kinematic tracking of ground-based MTIs. Tracking of air-based kinematic targets has been incorporated into the present invention within the last 6 months. Thus, discussion of ground-based MTIs is by way of example only, and not by way of limitation.

According to the present invention, the processing thread of the tracking function is automated as much as possible so as to ease the radar operators' workload. In those instances where a computer-based decision cannot be made, options will be provided to the radar operator which drive the processing thread. The tracking function processes radar returned generated MTIs which have been converted to the proper format by the MTI database server. The tracking function also processes MTIs simulated from distributed interactive simulation (DIS) truth. The MTIs are preprocessed and batched into groups per radar revisit for tracking use. Execution of the tracking function is not restricted by types of MTI radar service requests (RSRs), as is the case with contemporary automatic trackers, i.e., the tracking function is data driven, not radar mode driven. According to the preferred embodiment of the present invention, the tracking function supports only a first order type of track fusion, i.e., the grouping of tracks.

According to the preferred embodiment of the present invention, implementation of the tracking function does not involve a multiple hypothesis algorithm due to the large number of measurements and tracks involved. However, those skilled in the art will appreciate that a multiple hypothesis algorithm or the like may be utilized when processing speed improves due to technological advances. Further, according to the preferred embodiment of the present invention, the tracking function resides on the post-processing side of radar operation, thus making track-before-detect techniques not applicable.

Figure 8:
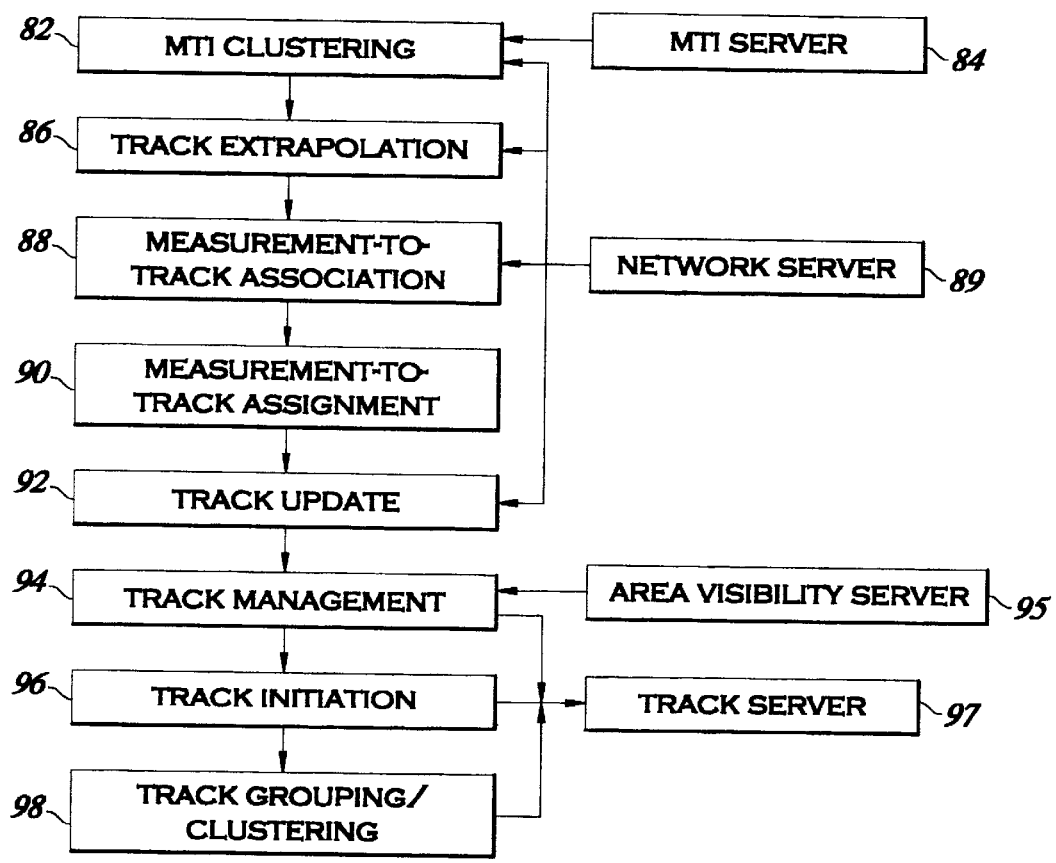
FIG. 8 is a block diagram showing the interdependencies of the $C^2I$ tracking function and servers according to the present invention.

The tracking function of the present invention subscribes to the MTI at initiation and receives a continuous stream of MTIs. The MTIs are grouped into radar revisit frames by radar operational (RDO). Tracks generated by the tracking function of the present invention are deposited into the track database to be managed and published by the track server as shown in FIG. 8 and discussed in detail below. Other components within the $C^2I$ systems subscribe to track data via the track server. Tracks are sent from the server to joint tactical information distribution system (JTIDS) and secured communications data links (SCDL) to be distributed to other platforms and ground stations, target mission nominator (TMN) for target prosecution, Integrated Battlespace Intelligence Server (IBS) for exploitation of domain knowledge, motion pattern analysis (MPA) for extraction of motion features, lines of communication (LOC) for updating of traffic network, traffic analysis (TA) for analysis of traffic activities, target evidence accumulator (TEA) for fusion with other MTI tracks and off-board sensor observations, and finally human machine interface (HMI) for display.

Referring now to FIG. 1, because of the ground-based nature of the MTIs discussed herein, and also because of the grazing angle 12 of the ground-based radar system of this example, the tracking function accesses the area visibility database so as to determine whether tracks that have lost correlation are actually being screened by the terrain. Such screening is determined by incrementally traversing the hypsographic database, from the track location out toward the horizon, at the sensor grazing angle. If the established line of site 10 falls below the terrain elevation 14, then the track is determined to be screened. The line of site 10 is defined as a straight line from the radar transceiver 16 to the target 18. The terrain 14 is part of the horizon 20 defined by the earth.

The tracking function of the present invention also estimates radar Doppler blind regions so as to maintain tracks that drop out due to being tangential to the radar line of site. Screened tracks are preferably displayed with a unique color.

Figure 7:
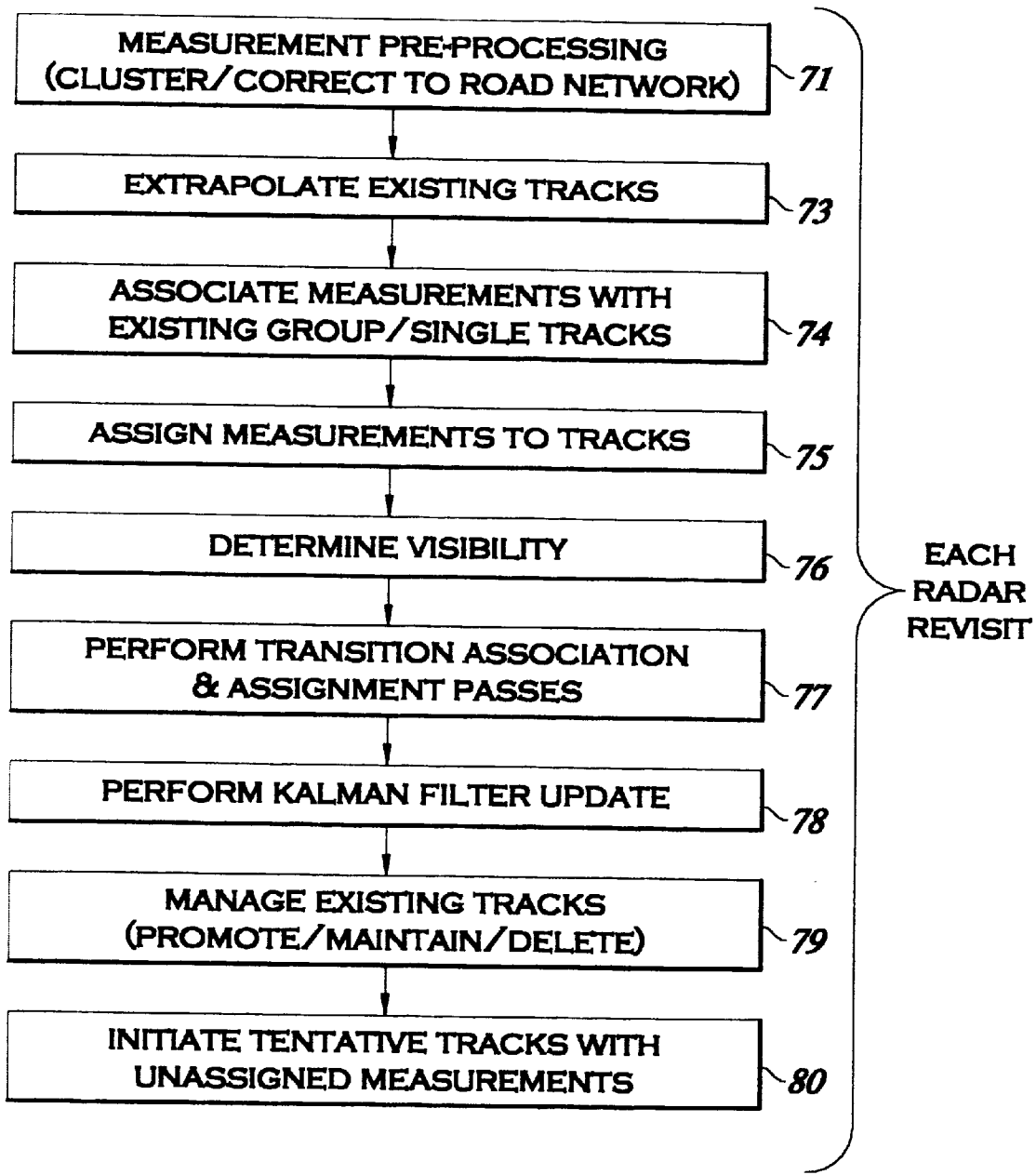
FIG. 7 is a flow diagram of the tracking algorithm sub-functions according to the present invention.

The tracking algorithm of the present invention comprises several major sub-functions. The sub-functions are: track management (initiation, promotion/demotion and termination); measurement to track association; measurement to track assignment; track extrapolation; and track update, as shown in FIG. 7 and discussed in detail below.

The track initiation sub-function determines when to start establishing an MTI track. The track is initiated from a series of MTIs that have associated in position and velocity over time.

The tracking function of the present invention generates tracks with various levels of confidence. Tracks with a low level of confidence are labeled tentative tracks. If these tentative tracks correlate with new measurements over time, then the track promotion sub-function promotes them to tracks with a high-level of confidence. These tracks are then labeled confirmed tracks. Preferably, only confirmed tracks are displayed to the operator to minimize cluttering of the display screen.

Those confirmed tracks which keep miscorrelating are demoted by the track demotion sub-function to tentative tracks and become candidates for deletion. The track termination sub-function deletes stale tentative tracks in order to keep the track pool manageable.

As a new set of MTI measurements is received by the tracking function, the measurement to track association sub-function identifies MTIs that potentially belong to existing tracks. Track association gates are derived from the track uncertainties and position and velocity. A likelihood measure is then calculated for each MTI so as to determine whether the MTI falls inside the association gate of a track. Association of the measurement to the track is made if the likelihood measure of the MTI is less than a Chi-squared threshold representing the association gate. The sub-function is performed at each radar revisit.

The measurement to track assignment sub-function makes the final assignment of MTIs from a new set of measurements to existing tracks based upon an assignment criteria derived from the association threshold. This sub-function is performed at each radar revisit. When the target scenario is dense, the revisit interval is exceedingly long for measurement observability, and/or the MTI quality is poor e.g., possessing a low probability of detection ($P_D$) high probability of false alarm ($P_{FA}$), the final assessment is deferred by one or more revisits.

The track extrapolation sub-function extrapolates existing tracks forward in time given the current track states via the time update mechanism of a sequential common filter. This sub-function coasts tracks that are determined to be screened by the terrain or that fall within Doppler blind region of the radar. It also predicts the state of the tracks prior to the collection of new MTIs. It serves as a basis for aiding battle management decision making such as time of arrival projection, engagement point determination, and weapon-target pairing. According to the preferred embodiment of the present invention, Motif/X11 interactive display windows allow the users to select tracks of interest, enter projected times or pick locations in the are of interest (AOI), and requests these types of spatial/temporal projections for the tracks.

The track updated sub-function updates the position and velocity states of existing tracks to the new MTIs that are assigned to the tracks via the measurement update mechanism of a sequential Kalman filter. Radar uncertainties exhibited by the MTIs are incorporated into the tracks by this sub-function.

Ground tracks fall into one or more of the following categories: single target track; group of tracks; group track; constrained track; unconstrained track; and stationary rotating track. The tracking function of the resent invention generates any combination of these types of tracks simultaneously and automatically.

Figure 2:
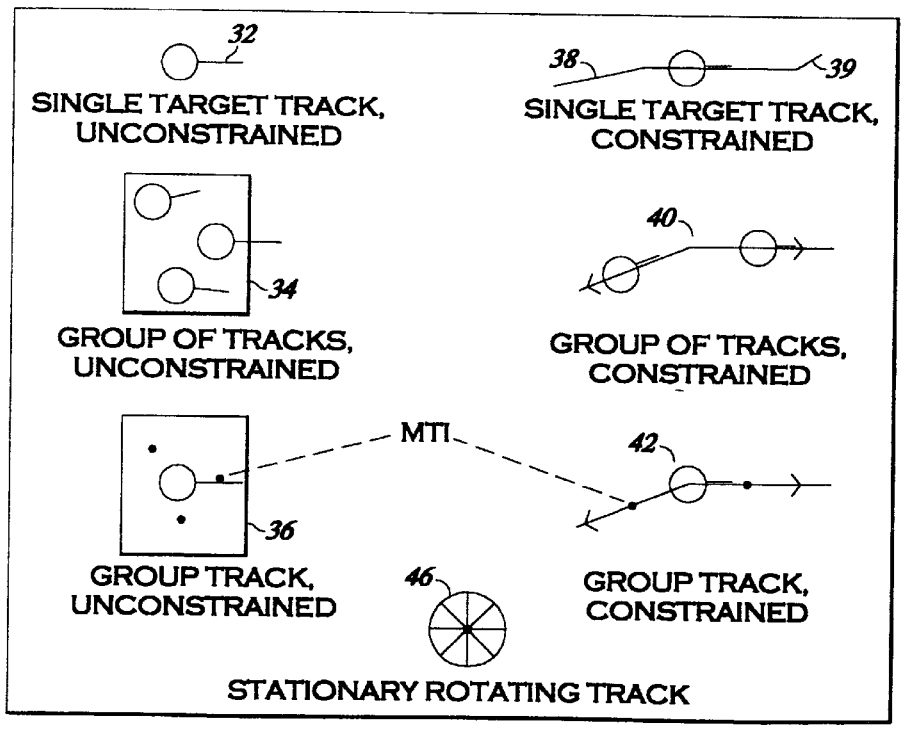
FIG. 2 shows track symbology utilized according to the present invention.

Referring now to FIG. 2, the preferred symbology used to display different track types is shown. A single unconstrained target track 32 comprises a circle with a straight line representing the velocity vector extending therefrom. A group of unconstrained tracks 34 preferably comprises a plurality of single target unconstrained tracks 32 having a boxed formed therearound. And unconstrained group track 36 preferably comprises an unconstrained track which represents the centroid of a plurality of MTI dots disposed thereabout and contained within a box. A constrained single target track 38 preferably comprises a circle superimposing the underlying road network, with a straight line representing the velocity vector extending therefrom. A constrained group of tracks 40 preferably comprises a plurality of single target constrained tracks 38 having arrowheads at either end thereof denoting the front and back of the group. A constrained group track 42 preferably comprises a constrained track which represents the centroid of a plurality of road-corrected MTI dots, having arrowheads formed proximate the ends thereof to denote the front and back of the group. The stationary rotating track 46 resembles a wagon wheel.

The tracking function supports tracking of individual MTIs as single target tracks. In this mode, the track states are smoothed estimates of individual MTI positions and velocities. A track symbol is placed at the single target track. Velocity is preferably graphically represented by a vector oriented along the estimated track heading and emanating from the track symbol. The length of the vector is preferably scaled so as to be representative of the track speed.

Figure 3:
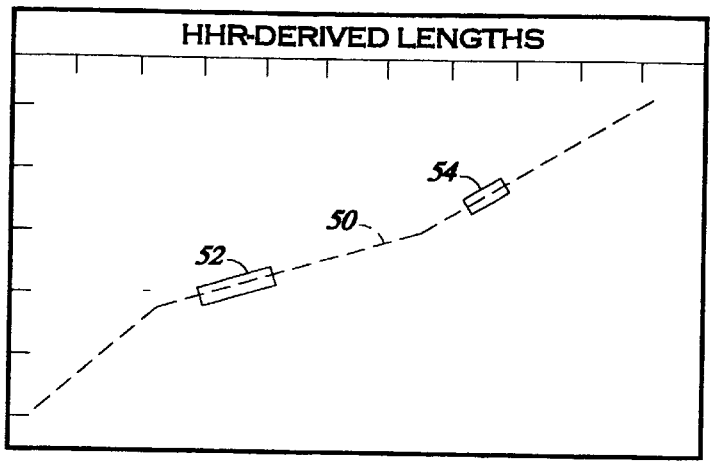
FIG. 3 is a display of high-range resolution (HRR)-derived lengths for constrained group track according to the present invention.

The tracking function provides the operator with the capability to group similar single target tracks into a group of tracks. Similarity between single target tracks is determined by their proximity, velocity, length/size, radar tracked vs. wheeled classification, and any additional domain information such as transport erector launcher (TEL) group make-up. The tracking function estimates target length by projecting the range extent of high-range resolution (HRR) MTI onto a road segment vector in the case of a network-constrained track or onto the latest track heading in the case of an unconstrained track. The estimated target length is smoothed with succeeding track updates. Tracks which have target lengths that exceed a user-selected threshold are preferably displayed with a unique color. The operator can then query for the most recent track length estimate by selecting the track information option under the MTI option, entering a track ID and pressing the high-range resolution (HRR)-derived length button on the X11 window that pops-up. When the apply button of the window is pressed at the next track update, a display of the estimated track length will be shown (FIG. 3). Grouping of tracks can be initiated either manually by an operator or automatically by a computer. Groups of track represent a first level of track fusion which aggregates the information from the individual tracks into a compact set as a step toward identifying the order of battle. A polygon surrounding the group formation is displayed so as to distinguish a group of unconstrained tracks from the other types of tracks. For a group of constrained tracks, only the front and back extents of the group are displayed by arrowheads, as discussed above. Tracks symbols are preferably placed at the individual tracks inside the group.

The tracking function supports tracking of a centroid of a group of MTIs. The tracking function provides an automatic clustering algorithm to group MTIs by their position and range rate. The clustering algorithm sorts unconstrained MTIs by their position and range rate, and constrained MTIs by their derived road distance and speed. Clusters of MTIs are formed based on user-selective spacings in speed and distance. For each group or cluster of MTIs found, the positions and range rates of the MTIs are averaged so as to generate the corresponding data from the group centroid, termed pseudo measurements. In this mode, the tracking sub-functions described earlier are applicable only to the group centroid. The tracking function, however, maintains linkage to the MTIs that compose a group track through the MTI server so that, if desired, the make-up of the group track can be interrogated. In this mode of query, the track server accesses the group track of interest, which stores a list of pointers to the MTIs that comprise it. A subscription is then made to the MTI server to retrieve the MTIs in question from the MTI history. For example, the operator can query for the display of the estimated lengths of MTIs that make-up a group track.

Referring now to FIG. 3, the high-range resolution (HRR) -derived lengths 50 are showing on a grid having 10-meter tick marks. Polygons 52, 54 are displayed surrounding the MTIs that comprise an unconstrained group track so as to distinguish the track from other types of tracks. For a constrained group track, only the front and back extents are displayed by arrowheads. Different colors are preferably used to further distinguish the groups of tracks from group tracks. The group-tracking mode and the single-target-tracking mode are controlled by the operator via an X11 window (not shown).

If the operator does not select automatic clustering, then all MTIs are tracked as single-target tracks. If the operator does select automatic clustering without specifying a minimum cluster size (number of MTIs in a group track), then the tracking function generates both single target tracks and group tracks. In this mode, single target tracks are formed from individual MTIs which do not meet the clustering criteria. If a minimum cluster size is specified with automatic clustering turned on, then only group tracks with a group size equal to or larger than the minimum cluster size are generated.

The tracking function supports tracking of MTIs which are determined to travel in a constrained fashion i.e., on a road network. In this mode, the tracking function subscribes to the road network server for network information.

Figure 4A:
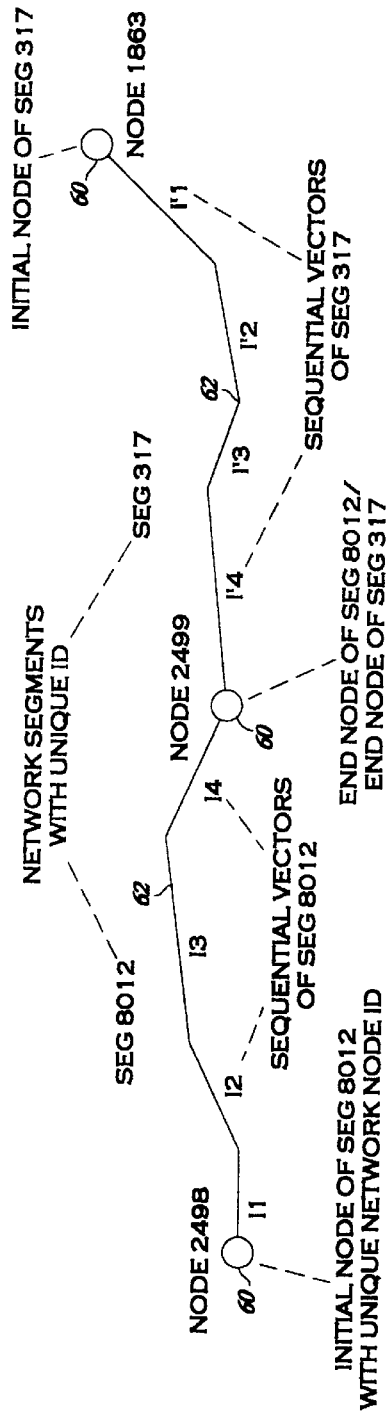
FIGS. 4a and 4b show the network traversal scheme of the present invention.
Figure 4B:
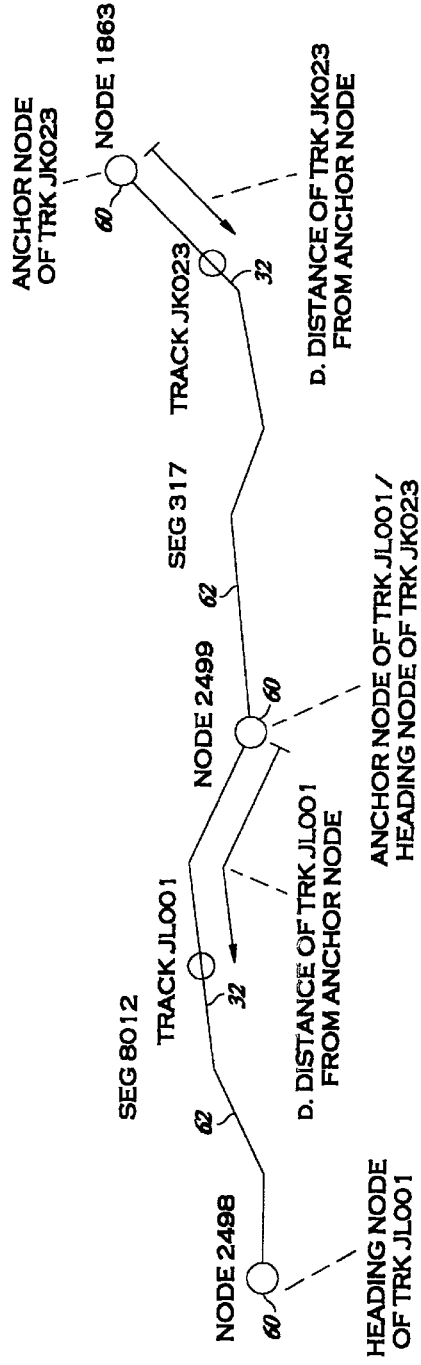

Referring now to FIGS. 4a and 4b, the tracking function maintains the directions of travel of constrained tracks by its own unique network traversal scheme. The range and cross-range error uncertainties of MTIs are processed by a maximum likelihood algorithm in an attempt to correct all MTIs to the road network and the area of interest (AOI). MTIs which have likelihood measures that are smaller than a pre-selected threshold are treated as network constrained MTIs. Network-corrected MTIs are displayed with a different color so as to distinguish them from the raw MTIs.

Figure 5:
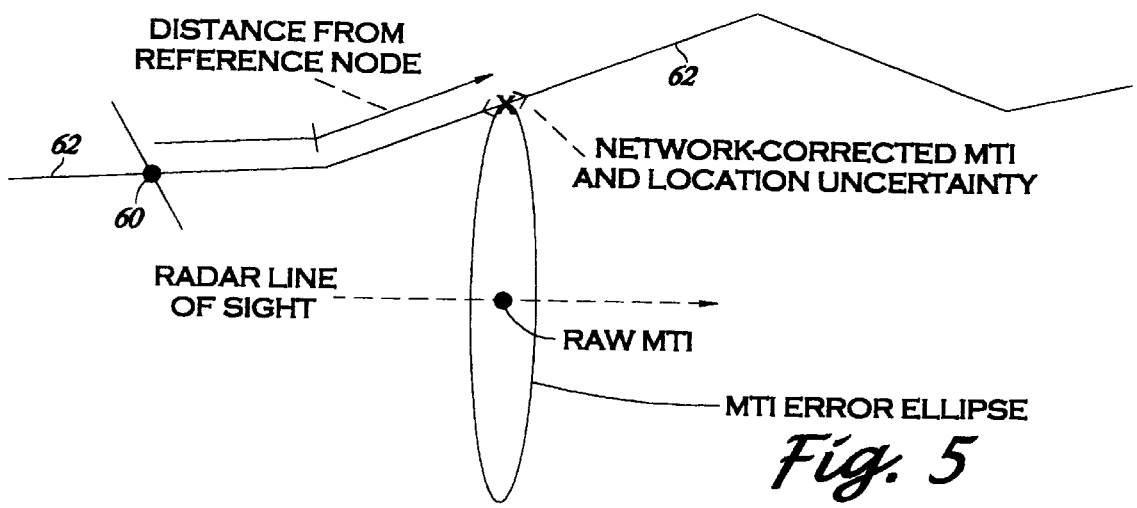
FIG. 5 shows correction of MTI to network according to the present invention.

The node 60 of FIGS. 4a, 4b and 5 represent points at which a decision must be made as to which segment 62 the target 32 is going to or is likely to travel upon next.

Referring now to FIG. 5, the speed along the road and distance from a point of reference on the road are derived for each constrained MTI by resolving range rate and position along the radar line of site onto the road segment vector. Similarly, uncertainties in speed and distance on a road are derived from the uncertainties in position and range rate of the raw MTI for the purpose of estimation. Tracks which are generated from constrained MTIs consequently have only one dimensional track states. This reduction in track state dimensionality results in faster estimation convergence when compared to the unconstrained tracking mode. The tracking function anticipates road intersections by generating extrapolated track candidates for on-coming road branches. For each new constrained MTI which falls within the track association, the track candidate closest to that MTI is selected for further processing.

As the density of the road network increases or the accuracy of the network degrades, the correction of MTIs to the network ultimately reaches a limit beyond which it does more harm than good, i.e., it places targets on the wrong roads. The operator thus has override capability on the constrained tracking mode and can chose to track in an unconstrained mode only.

The tracking function supports tracking of MTIs that are determined to travel in unconstrained fashion, i.e., not on any road. By default, MTIs that are not corrected to the road network are unconstrained MTIs. Due to the nature of open field target movements, the tracking function provides estimates of the track position and velocity both in the down track and cross track directions. In this mode, the tracking function uses larger association gates (as compared to the constrained mode) to compensate for target maneuvers that are more severe than those encountered in the constrained mode, mainly unanticipated turns, resulting in slower Kalman filter convergence.

To handle targets that move onto and off the road network, the tracking function automatically transits from unconstrained to constrained tracks and vice versa. Track transition is performed after the normal track association and assignment.

For a constrained track that miscorrelates and is not determined to be screened or in a Doppler blind region, the tracking function creates a temporary unconstrained track from the last correlated location of the constrained track. An unconstrained track association gate is derived in the direction perpendicular to the road segment vector where the track is located. The measurement to track association and assignment sub-functions are performed between the temporary unconstrained track and the pool of unassigned, unconstrained MTIs. If a successful assignment is made, the temporary unconstrained track is assigned the ID of the constrained track and the constrained to unconstrained track transition is complete.

For an unconstrained track that miscorrelates and is not determined to be screened or in a Doppler blind region, the tracking function temporarily converts all unassigned, constrained MTIs into unconstrained MTIs. The measurement to track association and assignment sub-functions are performed between the unconstrained track and the transformed unassigned, unconstrained MTIs. If a successful assignment is made, the unconstrained track is converted into a constrained track by updating its states with the original constrained MTI, then correcting the updated track to the road network.

A track transition is graphically denoted by the track symbol changing from an unconstrained track type to a constrained track type and vice versa, with the same track ID being retained.

The tracking function detects stationary rotating tracks by turning off the range rate aiding logic in its algorithm. Stationary rotating tracks are detected as part of the normal track initiation sub-function since tentative tracks that are candidates for promotion are only tracked by position. Stationary rotating tracks are denoted by a unique track symbol, without any velocity vector representing linear displacements.

Inputs to the tracking function are supplied mainly by the MTI server, to which the tracking function is a permanent subscriber on an as-available basis. Outputs from the tracking function are sent to the track server, which is then queried by other system components. In addition, the tracking function makes one-shot subscriptions to the area visibility server and the road network server on an as-needed basis. In the tabulation sections below, more explicit sources of inputs and destinations of outputs are listed for purposes of clarification.

| INPUT | SOURCE |
| --- | --- |
| MTI dwell header information: | |
| Dwell time | RDO |
| Radar service request | RDO |
| Platform position | Navigation |
| MTI amplified information: | |
| Position | RDO |
| Range Rate | RDO |
| HRR range extent | RDO |
| Radar cross section | RDO |
| Tracked/wheeled classification | RDO |
| Range rate quality indicator | RDO |
| Radar uncertainties (range, cross range, range rate standard deviation | RDO |
| MTI derived information: | |
| Distance from reference point on network | Network server |
| Speed on network segment | Network server |
| Road network information | Network server |
| Area visibility information | Area visibility server |
| Fusion feedback information: | |
| Track ID | TEA |
| Track time | TEA |
| Track location | TEA |
| Track status | TEA |
| Domain knowledge | IBIS, MAINS |

| NETWORK UTILITY | INPUTS | OUTPUTS |
| --- | --- | --- |
| Correct MTI to route | Unconstrained MTI records | Network-corrected MTI record (if likelihood cost is less than allowable threshold) |
| Get road vector | Location of a point on network, specified by segment ID, heading node ID, and distance to heading node | TCS coordinates of point and direction cosines of road link vector |
| Get extrapolated points | Network unique point specifying point to be extrapolated, extrapolated distance, number of network intersections | Number of extrapolated points found and corresponding number of network unique point records |
| Get adjacent roads | Network unique point record specifying input point, number of network intersections to be traversed, upper limit on number of returned segments, directional search flag (in direction of travel or in both directions) | Number of network segments connected to point and corresponding list of segment IDS |
| Get distance and directionally between two points | Network unique point records specifying two input points, number of network intersections to be traversed, directional search flag | Network distance between the two points, flag indicating whether the points are traversing the network in the same direction, toward or away from each other (if the points fall within the intersection limit) |

The tracking function must have enough computer resources such that it can track, in real time, thousands of MTIs from low range resolution radar scans, and/or hundreds of MTIs from medium/high range resolution radar scans. In other words, the maximum processing time allocated to the tracking function per radar revisits is, by definition, the revisit interval.

The performance of the tracking function is bounded by a TBD upper limit on the radar revisit interval. When the time interval between successive batches of MTIs approaches this upper bound, the measurement to track assignment sub-function degrades and will eventually fail, regardless of the algorithm used. In this case, the MTI formation detection function may be called to identify important sections of the area of interest (AOI) for more frequent radar coverage.

The operator has the option to exercise tracking over the complete area of interest (AOI) or over specific, smaller regions of the area of interest (AOI) by bounding these areas with boxes on the display screen. A set of tunable tracking parameters is displayed to the operator for review and modification. The tracking parameters are typically designed to control logical switches, display options, or thresholds used by the tracking sub-functions. A representative X11 window containing these parameters is shown in FIG. 6. Throughout the execution of the tracking process, the operator can change these parameters at any time.

At start-up, the tracking process subscribes to the MTI server on a permanent basis. The tracking process also subscribes to the network server on an initial basis to check on the availability of a network database. If a network database does not exist for the area of interest (AOI), the correction of MTIs to the network by the network utility is bypassed, all MTIs are treated as being unconstrained, and only unconstrained tracks are generated.

MTIs that have been batched into revisit frames are sent to the tracking process by the MTI server on a first-in-first-out basis. The tracking function correlates the MTIs by the radar service request (RSR) numbers and dwell times found in the MTI dwell header. The clustering algorithm and tracking algorithm, which comprises the track management, association, assignment, extrapolation, and update tracking sub-functions, are then executed. For each track update, the tracking process subscribes to the area visibility server to check on the availability of the visibility database about the track location. If area visibility data is not available, track screening determination is not performed.

Once tracks are generated, the operator can query for more detailed track information by selecting the track information option under the MTI option. In the X11 window that pops up, the operator can enter a track ID by typing the track reference number or by graphically dragging a box across the track symbol. The operator can use the same technique to designate priority tracks and send tracks of interest to target mission nominator (TMN) via the track priority option under the MTI option, or send track to integrated battlespace intelligence server (IBIS) and target evidence accumulator (TEA) via the communication option under the main menu bar.

Track history replay is available for display by means of the track server. The user's interface for this option is provided by an X11 window with prompts for mission start time and end times, a slide bar for controlling the display rate, and track type filtering buttons. In place of live MTI tracking, the tracking function can also process MTIs retrieved from history playback. In this mode, the look and feel of the tracking function operations are unchanged from a live MTI mode. The tracking function does not, however, generate MTI tracks backward in time.

Referring now to FIG. 7, the interdependencies of the tracking function and other components within the $C^2I$ system is shown. If group tracking is being provided, then cluster MTI detection 71 are performed and track pseudo measurements are generated from detected clusters. Existing tracks are then extrapolated 73. Measurements are associated 74 with existing group/single tracks. Measurements are assigned 75 to tracks. Area visibility is determined for miscorrelated tracks 76. Association and assignment are performed for transitioned tracks 77. Kalman filtering updates are performed 78 on correlated tracks. Existing tracks are managed 79, i.e., promoted, terminated or maintained, as discussed above. Unassigned measurements are initiated as tentative tracks 80. This process is repeated for each radar revisit. MTI detections clustering 71 and track pseudo measurement generation from detected cluster 72 is performed only during group tracking, and is not required for single target tracking.

Referring now to FIG. 8, the interdependencies of the $C^2I$ tracking function and servers is shown. The MTI server 84 provides MTI data to MTI clustering 82. The network server 89 provides data necessary for MTI clustering 82, track extrapolation 86, measurement-to-track association 88, measurement-to-track assignment 90, and track update 92. An area visibility server 95 facilitates track management 94. Track server 97 receives information from track management 94, track initiation 98, and track grouping/clustering 98.

It is understood that the exemplary method for tracking a target described herein and shown in the drawings represents only a presently preferred embodiment of the invention. The various modifications and additions may be made to such embodiment without departing from the spirit and scope of the invention. For example, although the present invention is discussed as being utilized for tracking ground-based targets, those skilled in the art will appreciate that the present invention may similarly be utilized to track rail-based and/or water-based targets, when they are similarly constrained. Thus, these and other modifications and additions may be obvious to those skilled in the art and may be implemented to adapt the present invention for use in a variety of different applications.

What is claimed is:

1. A method for predicting target location and movement through an environment utilizing location data for physical constraints disposed within the environment and determining restrictions on target movement within the environment in response to the location data, the method comprising the steps of:

(a) obtaining a location for each of the respective physical constraints;

(b) acquiring a target position and a target direction of movement;

(c) determining whether one or more of the physical constraints restrict target movement along the target direction of movement within the environment;

(d) predicting constrained route segments for the target in response to a determination that target movement along the target direction of movement is restricted by one or more of the physical constraints; and (e) predicting unconstrained route segments for the target in response to a determination that target movement along the target direction of movement is not restricted by the physical constraints.

2. The method of claim 1 wherein step (d) further comprises predicting the constrained route segments based on the target position, target direction of movement, and the respective locations of extermal constraints restricting target movement.

3. The method of claim 1 wherein step (e) further comprises predicting the unconstrained route segments based on the target position and target direction of movement.

4. The method of claim 1 wherein step (d) further comprises predicting constrained route segments based upon a known destination for the targets.

5. The method of claim 1 wherein step (e) further comprises predicting unconstrained route segments based upon a known destination for the target.

6. The method of claim 1 wherein step (b) further comprises obtaining the target position at least twice, measuring elapsed time between each acquisition of the position, and calculating a target directional velocity based on change in target position and the elapsed time between each acquisition of the target position.

7. The method of claim 1 wherein target movement is restricted to ground travel.

8. The method of claim 7 wherein target position and target direction of movement is obtained by radar detection.

9. The method of claim 8 wherein step (d) further comprises attempting to obtain a subsequent target position after predicting constrained route segments.

10. The method of claim 9 wherein step (d) further comprises obtaining terrain information for a land area along the constrained route segments, determining whether the terrain will shield the target from radar signals along the constrained route segments, and then classifying the target as screened when the subsequent target position cannot be obtained and when it is determined that the terrain shields the target from radar signals along the constrained route segments.

11. The method of claim 9 wherein step (d) further comprises predicting locations of radar blind regions, determining whether the radar blind regions are located along the constrained route segments, and classifying the target as screened when the subsequent target position cannot be obtained and when it is determined that the radar blind regions are located along the constrained route segments.

12. The method of claim 9 wherein step (d) further comprises returning to step (c) if the subsequent target position is obtained.

13. The method of claim 12 wherein step (c) further comprises comparing the constrained route segments with the subsequent target position and then classifying the constrained route segments in a low confidence category when the subsequent target position does not correspond with the constrained route segments.

14. The method of claim 12 wherein step (c) further comprises comparing the constrained route segments with the subsequent target position and then classifying the constrained route segments in a high confidence category when the subsequent target position corresponds with the constrained route segments.

15. The method of claim 1 wherein target movement is restricted to water travel.

16. The method of claim 1 wherein target movement is restricted to ground travel and air travel.

17. The method of claim 1 wherein the target movement includes water and air travel.

18. The method of claim 1 wherein the target movement includes water and ground travel.

19. A method for predicting movement of a plurality of targets through an environment utilizing location data for physical constraints disposed within the environment and determining restrictions on target movement within the environment in response to the location data, the method comprising steps of:
    (a) obtaining a location for each of the respective physical constraints;
    (b) acquiring a target position and a target direction of movement for each of the targets;
    (c) determining whether each target movement along each respective target direction of movement within the environment is restricted by one or more of the physical constraints;
    (d) predicting constrained route segments for any respective target in response to a determination that the respective target movement along the respective target direction of movement is restricted by one or more of the physical constraints; and
    (e) predicting unconstrained route segments for any respective target in response to a determination that the respective target movement along the respective target direction of movement is not restricted by the physical constraints.

20. The method of claim 19 wherein step (d) further comprises grouping individual targets into a single composite target when the targets are predicted to move along the same constrained route segments in unison.

21. The method of claim 19 wherein step (e) further comprises grouping individual targets into a single composite target when the targets are predicted to move along the same unconstrained route segments in unison.

22. A method for predicting target location and movement for a target restricted to ground travel through an environment containing physical constraints, the method comprising steps of:
    (a) obtaining a location for each of the respective constraints;
    (b) acquiring a target position and a target direction of movement by radar detection;
    (c) determining whether any constraints restrict target movement along the target direction of movement;
    (d) predicting constrained route segments for the target in response to a determination that target movement along the target direction of movement is restricted by one or more of the constraints, comparing the constrained route segments with a subsequent target position, and classifying the constrained route segments in a low confidence category when the subsequent target position does not correspond with the constrained route segments within a threshold association;
    (e) predicting unconstrained route segments for the target in response to a determination that target movement along the target direction of movement is not restricted by the constraints.

23. A method for predicting target location and movement for a target restricted to ground travel through an environment containing physical constraints, the method comprising steps of:
    (a) obtaining a location for each of the respective constraints;
    (b) acquiring a target position and a target direction of movement by radar detection;
    (c) determining whether any constraints restrict target movement along the target direction of movement;
    (d) predicting constrained route segments for the target in response to a determination that target movement along the target direction of movement is restricted by one or more of the constraints, comparing the constrained route segments with a subsequent target position, and classifying the constrained route segments in a high confidence category when the subsequent target position corresponds with the constrained route segments within a threshold association;
    (e) predicting unconstrained route segments for the target in response to a determination that target movement along the target direction of movement is not restricted by the constraints.

* * * * *